United States Patent
Ning et al.

(10) Patent No.: US 6,771,271 B2
(45) Date of Patent: Aug. 3, 2004

(54) APPARATUS AND METHOD OF PROCESSING IMAGE DATA

(75) Inventors: Ke Ning, Waltham, MA (US); Marc Hoffman, Mansfield, MA (US); Gabby Yi, Jamaica Plain, MA (US)

(73) Assignee: Analog Devices, Inc., Norwood, MA (US)

( * ) Notice: Subject to any disclaimer, the term of this patent is extended or adjusted under 35 U.S.C. 154(b) by 101 days.

(21) Appl. No.: 10/170,604

(22) Filed: Jun. 13, 2002

(65) Prior Publication Data

US 2003/0231183 A1 Dec. 18, 2003

(51) Int. Cl.$^7$ .............................................. G06F 13/00
(52) U.S. Cl. ...................................................... 345/537
(58) Field of Search ......................... 712/228; 345/545, 345/536–538, 564, 530, 501, 571

(56) References Cited

U.S. PATENT DOCUMENTS

| | | | |
|---|---|---|---|
| 4,811,411 A | 3/1989 | Hashihara et al. ............ 382/41 |
| 4,965,751 A | 10/1990 | Thayer et al. ............... 364/521 |
| 5,022,088 A | 6/1991 | Hisada et al. ................. 382/41 |
| 5,052,046 A | 9/1991 | Fukuda et al. ................ 382/41 |
| 6,411,302 B1 * | 6/2002 | Chiraz ......................... 345/545 |
| 2002/0091916 A1 * | 7/2002 | Dowling ...................... 712/228 |

* cited by examiner

Primary Examiner—Kee M. Tung
(74) Attorney, Agent, or Firm—Bromberg & Sunstein LLP

(57) ABSTRACT

A relatively high speed circular memory device, in combination with other processes, improves image processing efficiency. To that end, a method and apparatus of processing image data stored in an initial memory logically divides the image into a plurality of contiguous strips. A first plurality of the strips are stored in a working memory having a circular addressing arrangement, where the working memory is faster than the initial memory and has a plurality of sequential address locations. The first plurality of strips are contiguous and have a start address. In addition, the first plurality of strips are stored in the working memory in a contiguous manner, and processed through the working memory relative to the start address.

21 Claims, 6 Drawing Sheets

APPARATUS AND METHOD OF PROCESSING IMAGE DATA

FIELD OF THE INVENTION

The invention generally relates to memory management and, more particularly, the invention relates to improving memory efficiency in a graphics processing system.

BACKGROUND OF THE INVENTION

Among the many benefits of modern computer systems is their ability to produce vivid graphical displays. Consequently, computer systems have become widely used tools in various graphics arts, such as in photography and graphic design. Increased computer usage for such purposes, however, has the effect of increasing the complexity of designs and, correspondingly, the complexity of software producing the graphical images.

The art has responded to this need by adding more processing power to computer systems. For example, many computer systems have dedicated graphics processors specifically designed to reduce the computational burden on the main processor. Many such computers thus have processing speeds that exceed the speed of other computer components, such as the main memory (i.e., RAM) or the cache. In fact, many conventional personal computers have main processors that alone exceed the speed of the main memory and the cache. Accordingly, although processor speeds have increased, main memory and cache can produce processing bottlenecks within a computer system, undesirably impeding the image rasterization process.

SUMMARY OF THE INVENTION

In accordance with one aspect of the invention, a relatively high speed circular memory device, in combination with other processes, improves image processing efficiency. To that end, a method and apparatus of processing image data stored in an initial memory logically divides the image into a plurality of contiguous strips. A first plurality of the strips are stored in a working memory having a circular addressing arrangement, where the working memory is faster than the initial memory and has a plurality of sequential address locations. The first plurality of strips are contiguous and have a start address. In addition, the first plurality of strips are stored in the working memory in a contiguous manner, and processed through the working memory relative to the start address.

In some embodiments, the first plurality of strips are considered to be stored in a contiguous manner when contiguous portions of different strips (in the plurality of strips) are stored in contiguous address locations of the working memory. To maintain circularity, the working memory may have a first memory location and a last memory location, where the first memory location is logically contiguous with the last memory location. Moreover, during processing, an offset from the start addressed may be calculated.

In other embodiments, a new strip is stored in the working memory as the first plurality of strips are being processed. The new strip is contiguous with the first plurality of strips. At least one strip from the first plurality of strips thus may be processed together with the new strip. The working memory may be divided into a given number of strip areas, and the image data in each strip includes a plurality of rows of image data. In such embodiments, strips may be stored by shifting the plurality of rows for storage in the working memory based upon the given number of strip areas.

In accordance with other aspects of the invention, an apparatus for processing image data stored in an initial memory that is logically divided into a plurality of contiguous strips includes an address manager for accessing a working memory in a circular manner. The working memory is faster than the initial memory and has a plurality of sequential address locations. The apparatus also includes a data transfer device that stores a first plurality of the strips in the working memory, where the first plurality of strips are contiguous and having a start address. The first plurality of strips are stored in the working memory in a contiguous manner. The apparatus further includes a processor for processing the first plurality of strips through the working memory relative to the start address.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein:

FIG. 4A shows additional details of the configuration of the second (cache) memory shown in FIG. 3.

FIG. 4B shows another logical view of the second memory shown in FIG. 4A.

DESCRIPTION OF ILLUSTRATIVE EMBODIMENTS

In illustrative embodiments of the invention, image data in a computer system are transferred from a slower memory to a faster, circularly configured memory for processing. Details of illustrative embodiments are discussed below.

Figure 1:
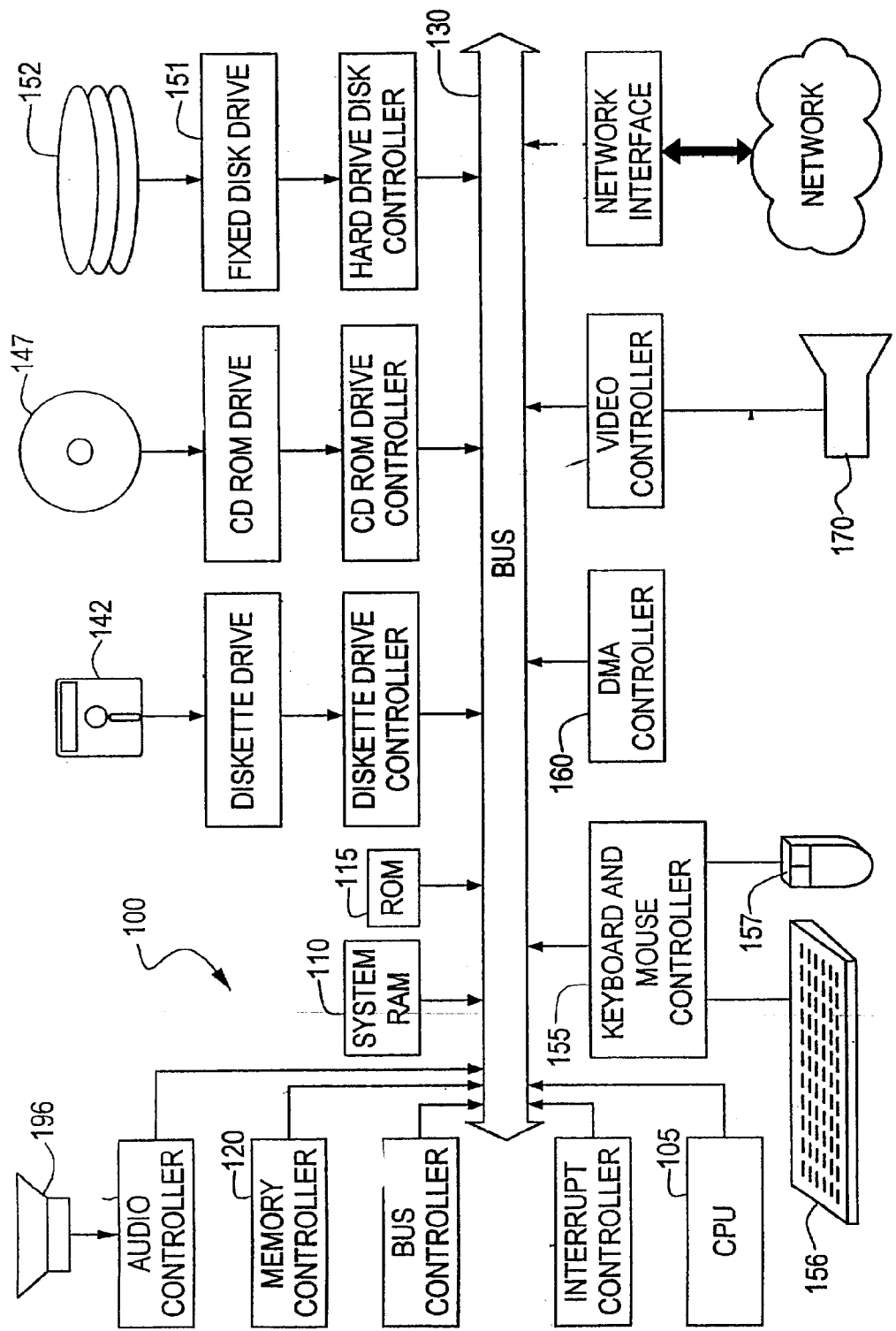
FIG. 1 schematically shows an exemplary computer system on which illustrative embodiments can be implemented.

FIG. 1 schematically shows an exemplary computer system on which illustrative embodiments can be implemented. The exemplary computer system 100 of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1.

The computer 100 includes a central processing unit (CPU) 105 having a conventional microprocessor, main memory 110 (e.g., random access memory, commonly referred to in the art as "RAM") for temporarily storing information, and read only memory (ROM) 115 for permanently storing read only information. In addition, the computer 100 also has a memory controller 120 for controlling system RAM 110, and a direct memory access (DMA) controller 160 for controlling direct memory access to the system RAM 110. The computer 100 also includes a main bus 130 for coupling various of the internal components.

Mass storage may be provided by known non-volatile storage media, such as a diskette 142, a digital versatile disk (commonly referred to in the art as a "DVD," not shown), a CD-ROM 147, and a hard disk 152. Moreover, data and software may be exchanged with the computer system 100 via removable media, such as the diskette 142 and the CD-ROM 147, or via a network connection.

User input to the computer 100 may be provided by a number of devices. For example, a keyboard 156 and a mouse 157 may be connected to the bus 130 by a keyboard and mouse controller 155. It should be obvious to those skilled in the art that other input devices, such as a digital camera, pen and/or tablet and a microphone for voice input, may be connected to computer 100 through bus 130 and appropriate controller.

The computer system 100 preferably is controlled and coordinated by operating system software, such as the WINDOWS NT® operating system (distributed from Microsoft Corp., of Redmond, Wash.). Among other computer system control functions, the operating system controls allocation of system resources and performs system tasks such as process scheduling, memory management, networking, and I/O services. Among other things, illustrative embodiments (which relate to memory management) may be implemented as part of the operating system, or as a separate utility.

Figure 2:
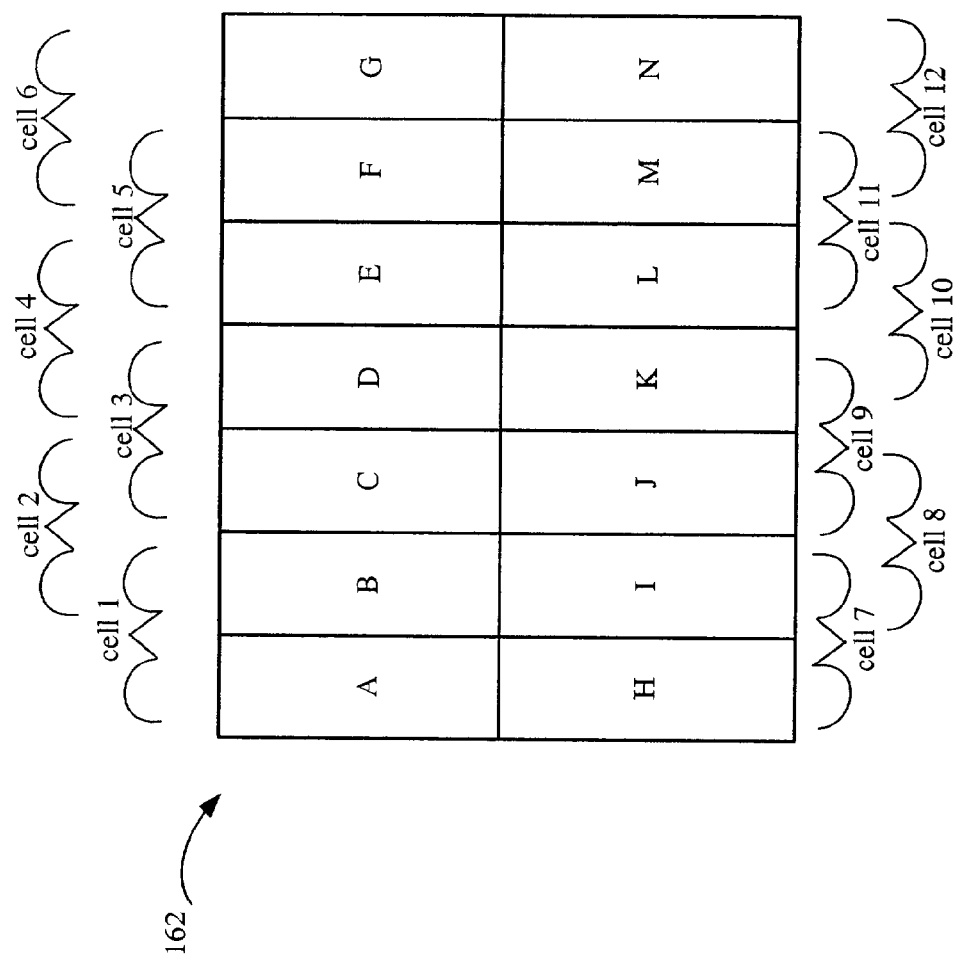
FIG. 2 schematically shows a frame of a graphical image that may be processed in accordance with illustrative embodiments of the invention.

FIG. 2 schematically shows a frame of a graphical image 162 that may be processed in accordance with illustrative embodiments of the invention. The graphical image 162 may be a digitized image generated from any known source, such as from a digital camera, or a video feed. By way of example, the image 162 may require some processing, such as application of compression operations in conformance with conventional MPEG standards.

To that end, the graphical image 162 is logically divided into a plurality of contiguous data strips (hereinafter "strips"), which are logically considered to form a plurality of contiguous data cells (hereinafter "cells"). Each strip consists of a two dimensional array of pixels that make up its respective portion of the image 162. In the example shown in FIG. 2, the image 162 is divided into two rows of seven strips. Each row of seven strips forms six cells. The strips are identified as strips A–N, while the cells are identified as cells 1–12. One cell consists of two contiguous strips. For example, strips A and B form cell 1. Below is a table showing the cells and their corresponding strips in FIG. 2:

| Cell | Strips |
|---|---|
| 1 | A, B |
| 2 | B, C |
| 3 | C, D |
| 4 | D, E |
| 5 | E, F |
| 6 | F, G |
| 7 | H, I |
| 8 | I, J |//

| Cell | Strips |
|---|---|
| 9 | J, K |
| 10 | K, L |
| 11 | L, M |
| 12 | M, N |

Cells are formed in each row so that each middle cell (i.e., neither the first cell nor the last cell in a row) overlaps with preceding and succeeding cells. For example, cell 2 is formed by strips B and C, while cell 3 is formed by strips C and D. Accordingly, cells 2 and 3 share strip C. In a similar manner, cells 1 and 2 share strip B. As discussed in greater detail below, this overlapping facilitates parallel processing by permitting pipelining in the internal memory system of the computer 100. Advantages of logical assignment of strips, such as improving processing speed, should be apparent to those skilled in the art.

It should be noted, however, that discussion of the logical strips and cells in FIG. 2 are exemplary and not intended to suggest that only that number of strips and cells suffice. In some embodiments, for example, a cell can be formed by three strips, or one strip. Accordingly, discussion of specific strip and cell sizes/numbers is not intended to limit the scope of various embodiments of the invention.

Figure 3:
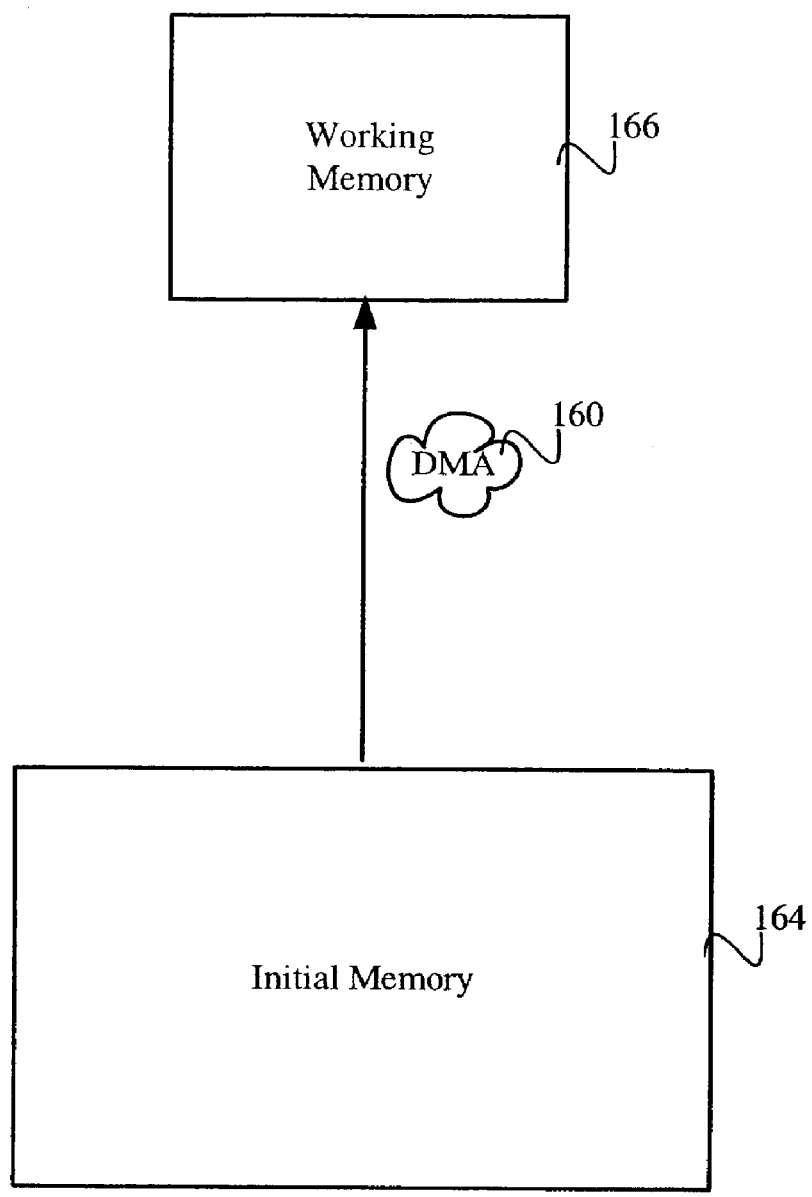
FIG. 3 shows the two memory devices that may be used to process the image.

The strips and cells of the image 162 shown in FIG. 2 illustratively are logically formed before the image 162 is processed in a fast memory. FIG. 3 shows the two memory devices that may be used to process such a logically divided image 162. At a high level, the image 162 initially is stored in an initial memory device (initial memory 164), and then transferred to a working memory device (working memory 166) in a strip by strip manner. The working memory 166 has a faster speed than that of the initial memory 164. The CPU 105 processes the image 162 while in the working memory 166.

More particularly, with reference to FIG. 3, the initial memory 164 may be an external SDRAM (synchronous dynamic random access memory) that stores the entire image 162. The DMA controller transfers strips of the image 162 into the working memory 166, which, in this example, is an internal cache memory. Details of the method of transferring and processing the image 162 are discussed in greater detail below with regard to FIGS. 5 and 6. It should be noted, however, that although SDRAM and cache are discussed, other types of memory having such relative speeds may be used. Accordingly, any slower memory device that transfers data to a faster memory for processing should suffice in many embodiments.

Figures 4A, 4B:
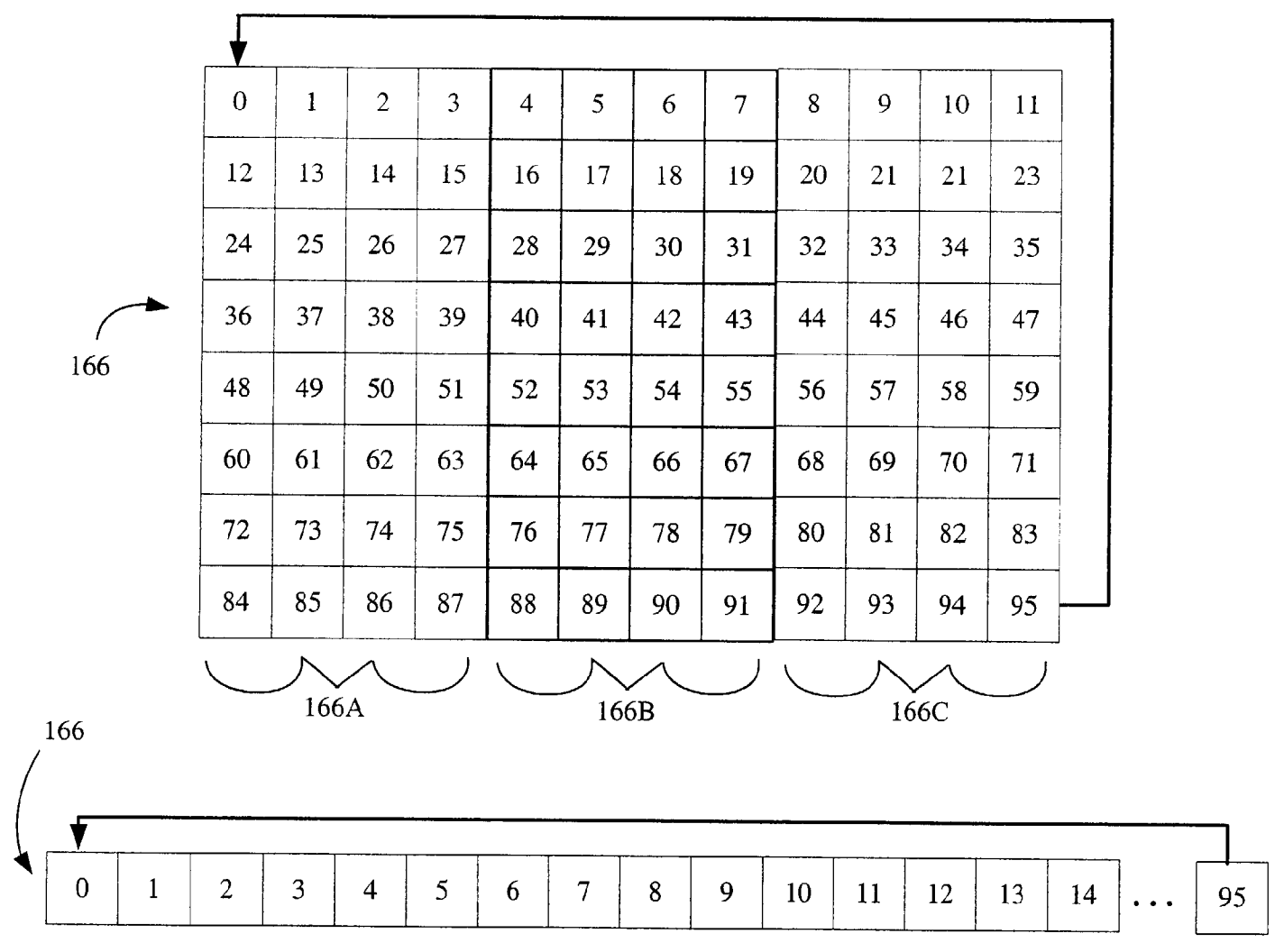

FIG. 4A shows additional details of the configuration of the second (cache) memory shown in FIG. 3. The working memory 166 is configured to have a set number of address locations (also referred to as "memory locations") that each store data for one pixel in the image 162. For example, the working memory 166 shown in FIG. 4A has address locations for 96 pixels of data. Each address location is sized, as appropriate, for storing the unprocessed image data received from the initial memory 164. Accordingly, each address location should have enough space to store color (e.g., red, green, and blue), transparency, depth, and other data required for a given pixel.

During processing, each address location may be traversed in succession. For example, if the first address location to be read is address location 0, then the second address location to be read will be address location 1, and the following address location to be read will be address location 2, etc. . . . In alternative embodiments, address locations are not processed in succession. In either embodiment, however, a base address is selected (discussed below and also referred to as a "start address"), and processing proceeds relative to that base address. More specifically, processing is performed at offsets relative to the base address. For example, if the base address is address location 4, then to process address locations 6–8, logic specifies to process address locations offset 2–4 from the base address.

In accordance with illustrative embodiments, the working memory 166 is configured to be a circular memory. Accordingly, after address location 95 is read, skipped, or otherwise traversed, processing reverts back to address location 0. Moreover, the working memory 166 is logically partitioned into two or more groups that correspond to the strips in the image 162. More specifically, the working memory 166 shown in FIG. 4A is divided into three equally sized blocks. The blocks are referred to herein as first block 166A, second block 166B and third block 166C. Each memory block is configured to be have the same total number of address locations as that of a strip of image data. In illustrative embodiments, each memory block thus is configured to have the exact two dimensional size as a strip of the image 162.

FIG. 4B shows another logical view of the working memory 166 shown in FIG. 4A. In particular, to a pointer or other memory traversing apparatus, the working memory 166 appears to be a one dimensional array of address locations. In the example shown, after address location 95 is traversed, address location 0 is read/skipped or otherwise traversed. Contiguous image data nevertheless is stored in address locations as shown in FIG. 4A.

In a manner similar to other elements of the invention, the total number of address locations shown in FIGS. 4A and 4B are exemplary. Accordingly, different numbers of address locations and partitions may be used, and different sized memory may be used. Discussion of specific sizes thus are not intended to limit the scope of the invention.

Figure 5:
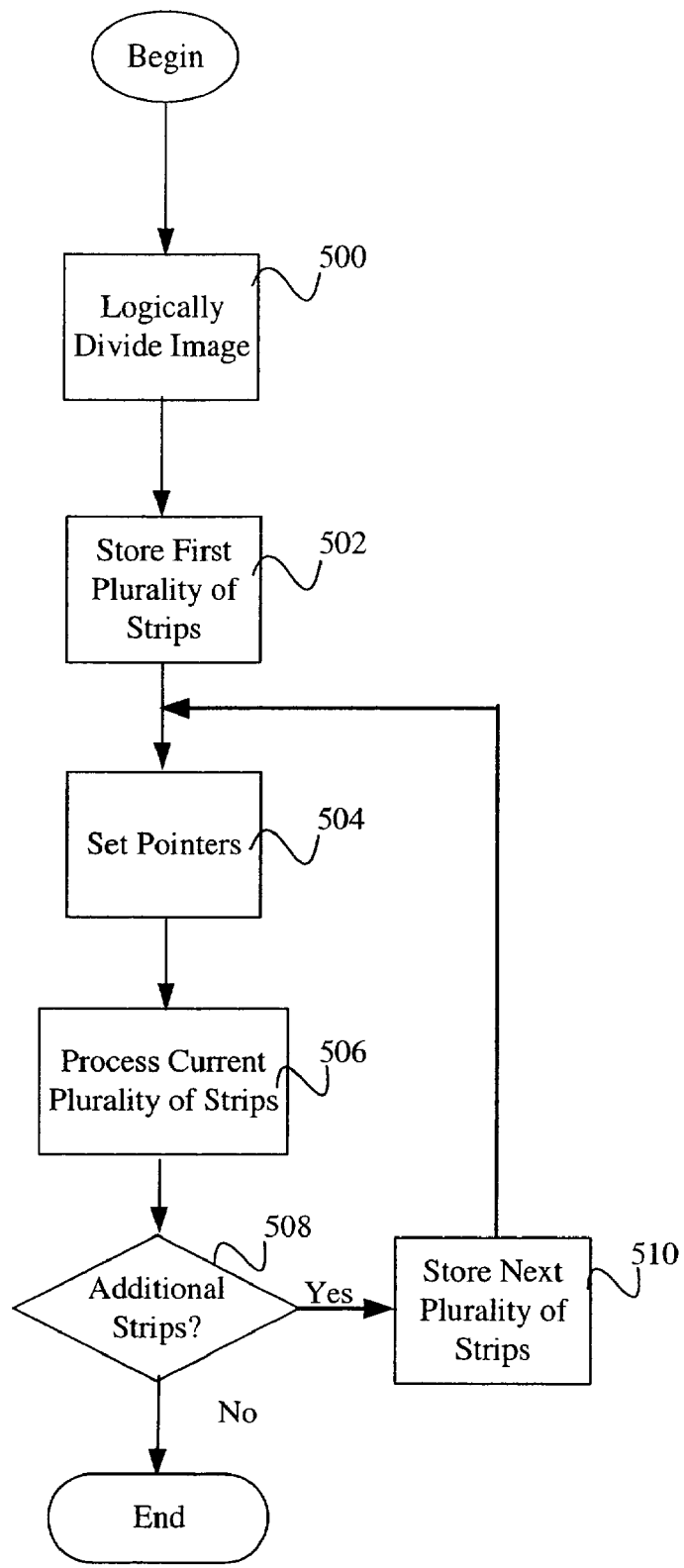
FIG. 5 shows an illustrative method of processing the image shown in FIG. 2.

FIG. 5 shows an illustrative method of processing the image 162 shown in FIG. 2. The method begins at step 500, in which the image 162 is logically divided into a plurality of strips. For example, the image 162 may be divided as shown in FIG. 2. Depending on the size of the image 162, the image 162 may be divided into one or more rows of strips, where, as noted above, each row forms a plurality of overlapping cells. The remaining steps thus are executed for each row in the image 162.

Specifically, a first plural set of contiguous strips then is transferred from the initial memory 164 (i.e., slower memory, such as level 2 memory) to the working memory 166 (i.e., faster memory, such as level 1 memory). In illustrative embodiments, strips A and B (i.e., cell 1) may by loaded first into the first and second blocks 166A and 166B of the working memory 166. As demonstrated in the drawings, the strips are loaded into the working memory 166 in a contiguous manner. More specifically, contiguous pixels between two contiguous strips are stored in contiguous address locations within the working memory 166. In the example shown, two contiguous strips have contiguous pixels in the same row.

To that end, the DMA controller is configured as a 2D-DMA. Among other things, it illustratively performs two operations; namely, 1) a "load" operation to load a cell (i.e., set of strips) onto a FIFO (first-in, first-out) pipe, and 2) a "store" operation to store an array of image data from the FIFO pipe into the working memory 166 as a two dimensional array of pixels (i.e., as a strip or cell). Note that, as discussed above, each strip is a two dimensional array of pixel data that forms a portion of the image 162. Accordingly, these operations ensure that strip data format is maintained as stored in the initial memory 164.

In illustrative embodiments, software semantics for the two noted DMA operations may be as follows:

```
// The DMA_LOAD semantics:
movtofifo (short *in, int xc, int xs, int ye, int ys)
{
        while (yc) {
                for (x=0;x<xc;x++) {
                        *fifo_write++ = *in;
                        in += xs;
                }
                in += ys;
                yc--;
        }
}
// The DMA_STORE semantics;
movfromfifo (short *out, int xc, int xs, int yc, int ys)
{
        while (yc) {
                for (x=0;x<xc;x++) {
                        *out = *fifo_read++;
                        out += xs;
                }
                out += ys;
                yc--;
        }
}
//Parameters:
xs - the x stride
xc - the x count
ys - the y stride
yc - the y count
sz - the element size 8bit, 16bit, 32bit
```

Figure 6:
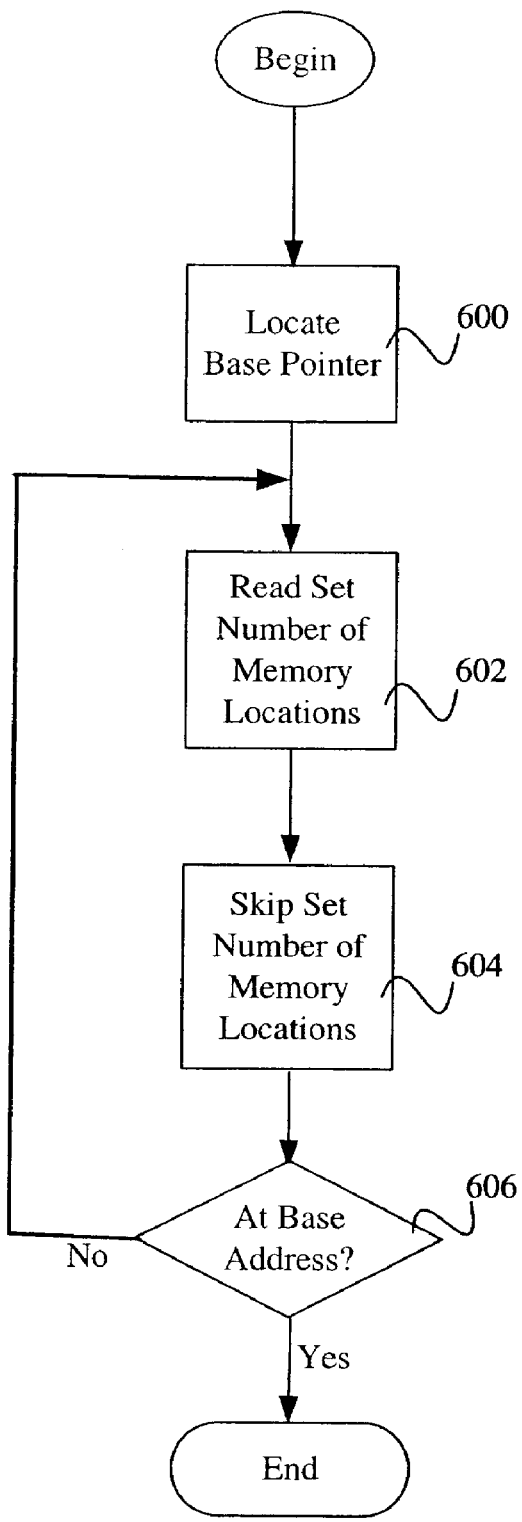
FIG. 6 shows an illustrative method of traversing through the second memory shown in FIGS. 3, 4A, and 4B.

After the first set of strips is loaded, then a pair of pointers are set at step 504. More specifically, the system is configured to have a base pointer that points to the first address location (in the working memory 166) of a given cell, and a reading pointer that points to an address location (also in the working memory 166) that is offset relative to the base pointer. Initially, both pointers point to the same address locations. For example, the pointers initially are set to point to the first address location in strip A. As shown in FIG. 6 (discussed below), the base pointer increments a set number of address locations each time a new cell is being processed, while the reading pointer successively increments once (for each address location) in each cell as such cell is being traversed.

Accordingly, the method continues to step 506, in which the current set of strips (i.e., the current cell being processed) is processed in accordance with the method discussed below with regard to FIG. 6. It then is determined at step 508 if the row being processed has additional strips for processing. If additional strips for that row are not to be processed, then the process ends (for that row).

Conversely, if additional strips are to be processed, then the process continues to step 510, in which the next set of strips are stored in the working memory 166. In the example shown in FIG. 2, a single strip of data (e.g., strip C) is stored in the next succeeding block of the working memory 166 which, in this case, now is the third block 166C of the working memory 166. The process then loops back to step 504, in which the pointers are reset. To that end, the base and reading pointers are set to point to the first address location of the next cell (e.g., the first memory location of strip B). Accordingly, the next cell (consisting of strips B and C) are processed, thus permitting data (i.e., strip B) to be reused. This method iterates until the entire row is processed. If the image 162 has additional rows, then the method repeats for the next row.

In illustrative embodiments, various steps of the method of FIG. 5 are performed either in a different order, or substantially simultaneously. For example, while a current set of strips is being processed (step 506), the CPU 105 may be determining if additional strips are to be processed (step 508) and, if so, it will store such strips in the next block of the working memory 166 (step 510). Accordingly, some embodiments combine these three steps into one substantially parallel operation.

FIG. 6 shows a method of processing the current set of strips as recited by step 506. The method begins at step 600, in which the base and reading pointers are located. This step may be implicit in the process and thus, not an affirmative step required in various embodiments. The process then continues to step 602, in which a set of address locations are read for processing. To that end, the reading pointer is incremented to read a set number of address locations from the base pointer. In the example discussed herein, the reading pointer is incremented eight times to read each of the first eight address locations in its current cell. Accordingly, this step permits the method to read parts of the two contiguous blocks of the working memory 166 that have cell data.

After the set of address locations are read, then the reading pointer skips a set of the next succeeding address locations (step 604). In the example shown, the reading pointer skips the next four address locations. This step thus permits the method to skip the one block of the working memory 166 that has no cell data. It then is determined at step 606 if the reading pointer is pointing to the same address as that pointed to by the base pointer (i.e., at the base address). If it is, then the method ends because the entire cell has been stored in the working memory 166. Conversely, if the reading pointer is pointing to a different address location, then the process loops back to step 602, in which a set number of the next address locations are read. Accordingly, this method iterates until an entire cell is stored in the working memory 166. As noted above, after reading address locations, the CPU 105 may perform some processing functions, such as compressing the image data.

Accordingly, the method described in FIGS. 5 and 6 permits two dimensional arrays of pixel data to be stored in the working memory 166. Beginning the reading/storage processes from the base pointer and configuring the working memory 166 as circular memory permit this to be efficiently accomplished.

Below is an example showing nine iterations of the methods described herein in the working memory 166 shown in FIG. 4A. More specifically, the example shows the content of the working memory 166 through nine iterations of image processing. The image 162 has pixels that are sequentially addressed in rows. In other words, each row has 64 sequentially addressed pixel locations. The parameters of this example are as follows:

| | |
|---|---|
| Image size: | 64 × 64 |
| Strip size: | 4 × 8 |
| Number of strips: | 16 strips per row, 8 rows of strips, total of 128 strips |
| Cell size: | 8 × 8 (2 strips) |
| Circular addressing size: | 3 * 4 * 8 |

In the example below, each pixel in the image 162 is identified in the following format: "a(row, column)." Indicia such as "a(0,1)" thus represents pixel data for the pixel located in row 0 and column 1 of the image 162. In addition, the address number of each memory location in the first column of the working memory 166 is listed immediately to the left of the first column of the working memory 166. Of course, all addresses in the exemplary working memory 166 also can be ascertained with reference to FIG. 4A. Finally, the base address of each iteration is capitalized and underlined, while the memory portion receiving image data is bolded.

Simulation Output:

| | | | | | Iteration (1). Base address = 0 | | | | | | | |
|---|---|---|---|---|---|---|---|---|---|---|---|---|
| 0000: | A[0,0] | a[0, 1] | a[0, 2] | a[0, 3] | a[0, 4] | a[0, 5] | a[0, 6] | a[0, 7] | N/A | N/A | N/A | N/A |
| 0012: | a[1, 0] | a[1, 1] | a[1, 2] | a[1, 3] | a[1, 4] | a[1, 5] | a[1, 6] | a[1, 7] | N/A | N/A | N/A | N/A |
| 0024: | a[2, 0] | a[2, 1] | a[2, 2] | a[2, 3] | a[2, 4] | a[2, 5] | a[2, 6] | a[2, 7] | N/A | N/A | N/A | N/A |
| 0036: | a[3, 0] | a[3, 1] | a[3, 2] | a[3, 3] | a[3, 4] | a[3, 5] | a[3, 6] | a[3, 7] | N/A | N/A | N/A | N/A |
| 0048: | a[4, 0] | a[4, 1] | a[4, 2] | a[4, 3] | a[4, 4] | a[4, 5] | a[4, 6] | a[4, 7] | N/A | N/A | N/A | N/A |
| 0060: | a[5, 0] | a[5, 1] | a[5, 2] | a[5, 3] | a[5, 4] | a[5, 5] | a[5, 6] | a[5, 7] | N/A | N/A | N/A | N/A |
| 0072: | a[6, 0] | a[6, 1] | a[6, 2] | a[6, 3] | a[6, 4] | a[6, 5] | a[6, 6] | a[6, 7] | N/A | N/A | N/A | N/A |
| 0084: | a[7, 0] | a[7, 1] | a[7, 2] | a[7, 3] | a[7, 4] | a[7, 5] | a[7, 6] | a[7, 7] | N/A | N/A | N/A | N/A |

| | | | | | Iteration (2). Base address = 4 | | | | | | | |
|---|---|---|---|---|---|---|---|---|---|---|---|---|
| 0000: | a[0, 0] | a[0, 1] | a[0, 2] | a[0, 3] | A[0,4] | a[0, 5] | a[0, 6] | a[0, 7] | a[0, 8] | a[0, 9] | a[0, 10] | a[0, 11] |
| 0012: | a[1, 0] | a[1, 1] | a[1, 2] | a[1, 3] | a[1, 4] | a[1, 5] | a[1, 6] | a[1, 7] | a[1, 8] | a[1, 9] | a[1, 10] | a[1, 11] |
| 0024: | a[2, 0] | a[2, 1] | a[2, 2] | a[2, 3] | a[2, 4] | a[2, 5] | a[2, 6] | a[2, 7] | a[2, 8] | a[2, 9] | a[2, 10] | a[2, 11] |
| 0036: | a[3, 0] | a[3, 1] | a[3, 2] | a[3, 3] | a[3, 4] | a[3, 5] | a[3, 6] | a[3, 7] | a[3, 8] | a[3, 9] | a[3, 10] | a[3, 11] |
| 0048: | a[4, 0] | a[4, 1] | a[4, 2] | a[4, 3] | a[4, 4] | a[4, 5] | a[4, 6] | a[4, 7] | a[4, 8] | a[4, 9] | a[4, 10] | a[4, 11] |
| 0060: | a[5, 0] | a[5, 1] | a[5, 2] | a[5, 3] | a[5, 4] | a[5, 5] | a[5, 6] | a[5, 7] | a[5, 8] | a[5, 9] | a[5, 10] | a[5, 11] |

| Iteration (2). Base address = 4 |
| --- |

| | | | | | | | | | | | |
| --- | --- | --- | --- | --- | --- | --- | --- | --- | --- | --- | --- |
| 0072: | a[6, 0] | a[6, 1] | a[6, 2] | a[6, 3] | a[6, 4] | a[6, 5] | a[6, 6] | a[6, 7] | a[6, 8] | a[6, 9] | a[6, 10] | a[6, 11] |
| 0084: | a[7, 0] | a[7, 1] | a[7, 2] | a[7, 3] | a[7, 4] | a[7, 5] | a[7, 6] | a[7, 7] | a[7, 8] | a[7, 9] | a[7, 10] | a[7, 11] |

| Iteration (3). Base address = 8 |
| --- |

| | | | | | | | | | | | |
| --- | --- | --- | --- | --- | --- | --- | --- | --- | --- | --- | --- |
| 0000: | a[7, 12] | a[7, 13] | a[7, 14] | a[7, 15] | a[0, 4] | a[0, 5] | a[0, 6] | a[0, 7] | A[0,8] | a[0, 9] | a[0, 10] | a[0, 11] |
| 0012: | a[0, 12] | a[0, 13] | a[0, 14] | a[0, 15] | a[1, 4] | a[1, 5] | a[1, 6] | a[1, 7] | a[1, 8] | a[1, 9] | a[1, 10] | a[1, 11] |
| 0024: | a[1, 12] | a[1, 13] | a[1, 14] | a[1, 15] | a[2, 4] | a[2, 5] | a[2, 6] | a[2, 7] | a[2, 8] | a[2, 9] | a[2, 10] | a[2, 11] |
| 0036: | a[2, 12] | a[2, 13] | a[2, 14] | a[2, 15] | a[3, 4] | a[3, 5] | a[3, 6] | a[3, 7] | a[3, 8] | a[3, 9] | a[3, 10] | a[3, 11] |
| 0048: | a[3, 12] | a[3, 13] | a[3, 14] | a[3, 15] | a[4, 4] | a[4, 5] | a[4, 6] | a[4, 7] | a[4, 8] | a[4, 9] | a[4, 10] | a[4, 11] |
| 0060: | a[4, 12] | a[4, 13] | a[4, 14] | a[4, 15] | a[5, 4] | a[5, 5] | a[5, 6] | a[5, 7] | a[5, 8] | a[5, 9] | a[5, 10] | a[5, 11] |
| 0072: | a[5, 12] | a[5, 13] | a[5, 14] | a[5, 15] | a[6, 4] | a[6, 5] | a[6, 6] | a[6, 7] | a[6, 8] | a[6, 9] | a[6, 10] | a[6, 11] |
| 0084: | a[6, 12] | a[6, 13] | a[6, 14] | a[6, 15] | a[7, 4] | a[7, 5] | a[7, 6] | a[7, 7] | a[7, 8] | a[7, 9] | a[7, 10] | a[7, 11] |

| Iteration (4). Base address = 12 |
| --- |

| | | | | | | | | | | | |
| --- | --- | --- | --- | --- | --- | --- | --- | --- | --- | --- | --- |
| 0000: | a[7, 12] | a[7, 13] | a[7, 14] | a[7, 15] | a[7, 16] | a[7, 17] | a[7, 18] | a[7, 19] | a[0, 8] | a[0, 9] | a[0, 10] | a[0, 11] |
| 0012: | A[0,12] | a[0, 13] | a[0, 14] | a[0, 15] | a[0, 16] | a[0, 17] | a[0, 18] | a[0, 19] | a[1, 8] | a[1, 9] | a[1, 10] | a[1, 11] |
| 0024: | a[1, 12] | a[1, 13] | a[1, 14] | a[1, 15] | a[1, 16] | a[1, 17] | a[1, 18] | a[1, 19] | a[2, 8] | a[2, 9] | a[2, 10] | a[2, 11] |
| 0036: | a[2, 12] | a[2, 13] | a[2, 14] | a[2, 15] | a[2, 16] | a[2, 17] | a[2, 18] | a[2, 19] | a[3, 8] | a[3, 9] | a[3, 10] | a[3, 11] |
| 0048: | a[3, 12] | a[3, 13] | a[3, 14] | a[3, 15] | a[3, 16] | a[3, 17] | a[3, 18] | a[3, 19] | a[4, 8] | a[4, 9] | a[4, 10] | a[4, 11] |
| 0060: | a[4, 12] | a[4, 13] | a[4, 14] | a[4, 15] | a[4, 16] | a[4, 17] | a[4, 18] | a[4, 19] | a[5, 8] | a[5, 9] | a[5, 10] | a[5, 11] |
| 0072: | a[5, 12] | a[5, 13] | a[5, 14] | a[5, 15] | a[5, 16] | a[5, 17] | a[5, 18] | a[5, 19] | a[6, 8] | a[6, 9] | a[6, 10] | a[6, 11] |
| 0084: | a[6, 12] | a[6, 13] | a[6, 14] | a[6, 15] | a[6, 16] | a[6, 17] | a[6, 18] | a[6, 19] | a[7, 8] | a[7, 9] | a[7, 10] | a[7, 11] |

| Iteration (5). Base address = 16 |
| --- |

| | | | | | | | | | | | |
| --- | --- | --- | --- | --- | --- | --- | --- | --- | --- | --- | --- |
| 0000: | a[7, 12] | a[7, 13] | a[7, 14] | a[7, 15] | a[7, 16] | a[7, 17] | a[7, 18] | a[7, 19] | a[7, 20] | a[7, 21] | a[7, 22] | a[7, 23] |
| 0012: | a[0, 12] | a[0, 13] | a[0, 14] | a[0, 15] | A[0,16] | a[0, 17] | a[0, 18] | a[0, 19] | a[0, 20] | a[0, 21] | a[0, 22] | a[0, 23] |
| 0024: | a[1, 12] | a[1, 13] | a[1, 14] | a[1, 15] | a[1, 16] | a[1, 17] | a[1, 18] | a[1, 19] | a[1, 20] | a[1, 21] | a[1, 22] | a[1, 23] |
| 0036: | a[2, 12] | a[2, 13] | a[2, 14] | a[2, 15] | a[2, 16] | a[2, 17] | a[2, 18] | a[2, 19] | a[2, 20] | a[2, 21] | a[2, 22] | a[2, 23] |
| 0048: | a[3, 12] | a[3, 13] | a[3, 14] | a[3, 15] | a[3, 16] | a[3, 17] | a[3, 18] | a[3, 19] | a[3, 20] | a[3, 21] | a[3, 22] | a[3, 23] |
| 0060: | a[4, 12] | a[4, 13] | a[4, 14] | a[4, 15] | a[4, 16] | a[4, 17] | a[4, 18] | a[4, 19] | a[4, 20] | a[4, 21] | a[4, 22] | a[4, 23] |
| 0072: | a[5, 12] | a[5, 13] | a[5, 14] | a[5, 15] | a[5, 16] | a[5, 17] | a[5, 18] | a[5, 19] | a[5, 20] | a[5, 21] | a[5, 22] | a[5, 23] |
| 0084: | a[6, 12] | a[6, 13] | a[6, 14] | a[6, 15] | a[6, 16] | a[6, 17] | a[6, 18] | a[6, 19] | a[6, 20] | a[6, 21] | a[6, 22] | a[6, 23] |

| Iteration (6). Base address = 20 |
| --- |

| | | | | | | | | | | | |
| --- | --- | --- | --- | --- | --- | --- | --- | --- | --- | --- | --- |
| 0000: | a[6, 24] | a[6, 25] | a[6, 26] | a[6, 27] | a[7, 16] | a[7, 17] | a[7, 18] | a[7, 19] | a[7, 20] | a[7, 21] | a[7, 22] | a[7, 23] |
| 0012: | a[7, 24] | a[7, 25] | a[7, 26] | a[7, 27] | a[0, 16] | a[0, 17] | a[0, 18] | a[0, 19] | A[0,20] | a[0, 21] | a[0, 22] | a[0, 23] |
| 0024: | a[0, 24] | a[0, 25] | a[0, 26] | a[0, 27] | a[1, 16] | a[1, 17] | a[1, 18] | a[1, 19] | a[1, 20] | a[1, 21] | a[1, 22] | a[1, 23] |
| 0036: | a[1, 24] | a[1, 25] | a[1, 26] | a[1, 27] | a[2, 16] | a[2, 17] | a[2, 18] | a[2, 19] | a[2, 20] | a[2, 21] | a[2, 22] | a[2, 23] |
| 0048: | a[2, 24] | a[2, 25] | a[2, 26] | a[2, 27] | a[3, 16] | a[3, 17] | a[3, 18] | a[3, 19] | a[3, 20] | a[3, 21] | a[3, 22] | a[3, 23] |
| 0060: | a[3, 24] | a[3, 25] | a[3, 26] | a[3, 27] | a[4, 16] | a[4, 17] | a[4, 18] | a[4, 19] | a[4, 20] | a[4, 21] | a[4, 22] | a[4, 23] |
| 0072: | a[4, 24] | a[4, 25] | a[4, 26] | a[4, 27] | a[5, 16] | a[5, 17] | a[5, 18] | a[5, 19] | a[5, 20] | a[5, 21] | a[5, 22] | a[5, 23] |
| 0084: | a[5, 24] | a[5, 25] | a[5, 26] | a[5, 27] | a[6, 16] | a[6, 17] | a[6, 18] | a[6, 19] | a[6, 20] | a[6, 21] | a[6, 22] | a[6, 23] |

| Iteration (7). Base address = 24 |
| --- |

| | | | | | | | | | | | |
| --- | --- | --- | --- | --- | --- | --- | --- | --- | --- | --- | --- |
| 0000: | a[6, 24] | a[6, 25] | a[6, 26] | a[6, 27] | a[6, 28] | a[6, 29] | a[6, 30] | a[6, 31] | a[7, 20] | a[7, 21] | a[7, 22] | a[7, 23] |
| 0012: | a[7, 24] | a[7, 25] | a[7, 26] | a[7, 27] | a[7, 28] | a[7, 29] | a[7, 30] | a[7, 31] | a[0, 20] | a[0, 21] | a[0, 22] | a[0, 23] |
| 0024: | A[0,24] | a[0, 25] | a[0, 26] | a[0, 27] | a[0, 28] | a[0, 29] | a[0, 30] | a[0, 31] | a[1, 20] | a[1, 21] | a[1, 22] | a[1, 23] |
| 0036: | a[1, 24] | a[1, 25] | a[1, 26] | a[1, 27] | a[1, 28] | a[1, 29] | a[1, 30] | a[1, 31] | a[2, 20] | a[2, 21] | a[2, 22] | a[2, 23] |
| 0048: | a[2, 24] | a[2, 25] | a[2, 26] | a[2, 27] | a[2, 28] | a[2, 29] | a[2, 30] | a[2, 31] | a[3, 20] | a[3, 21] | a[3, 22] | a[3, 23] |
| 0060: | a[3, 24] | a[3, 25] | a[3, 26] | a[3, 27] | a[3, 28] | a[3, 29] | a[3, 30] | a[3, 31] | a[4, 20] | a[4, 21] | a[4, 22] | a[4, 23] |

-continued

| Iteration (7). Base address = 24 | | | | | | | | | | | |
|---|---|---|---|---|---|---|---|---|---|---|---|
| 0072: a[4, 24] | a[4, 25] | a[4, 26] | a[4, 27] | a[4, 28] | a[4, 29] | a[4, 30] | a[4, 31] | a[5, 20] | a[5, 21] | a[5, 22] | a[5, 23] |
| 0084: a[5, 24] | a[5, 25] | a[5, 26] | a[5, 27] | a[5, 28] | a[5, 29] | a[5, 30] | a[5, 31] | a[6, 20] | a[6, 21] | a[6, 22] | a[6, 23] |

| Iteration (8). Base address = 28 | | | | | | | | | | | |
|---|---|---|---|---|---|---|---|---|---|---|---|
| 0000: a[6, 24] | a[6, 25] | a[6, 26] | a[6, 27] | a[6, 28] | a[6, 29] | a[6, 30] | a[6, 31] | a[6, 32] | a[6, 33] | a[6, 34] | a[6, 35] |
| 0012: a[7, 24] | a[7, 25] | a[7, 26] | a[7, 27] | a[7, 28] | a[7, 29] | a[7, 30] | a[7, 31] | a[7, 32] | a[7, 33] | a[7, 34] | a[7, 35] |
| 0024: a[0, 24] | a[0, 25] | a[0, 26] | a[0, 27] | A[0,28] | a[0, 29] | a[0, 30] | a[0, 31] | a[0, 32] | a[0, 33] | a[0, 34] | a[0, 35] |
| 0036: a[1, 24] | a[1, 25] | a[1, 26] | a[1, 27] | a[1, 28] | a[1, 29] | a[1, 30] | a[1, 31] | a[1, 32] | a[1, 33] | a[1, 34] | a[1, 35] |
| 0048: a[2, 24] | a[2, 25] | a[2, 26] | a[2, 27] | a[2, 28] | a[2, 29] | a[2, 30] | a[2, 31] | a[2, 32] | a[2, 33] | a[2, 34] | a[2, 35] |
| 0060: a[3, 24] | a[3, 25] | a[3, 26] | a[3, 27] | a[3, 28] | a[3, 29] | a[3, 30] | a[3, 31] | a[3, 32] | a[3, 33] | a[3, 34] | a[3, 35] |
| 0072: a[4, 24] | a[4, 25] | a[4, 26] | a[4, 27] | a[4, 28] | a[4, 29] | a[4, 30] | a[4, 31] | a[4, 32] | a[4, 33] | a[4, 34] | a[4, 35] |
| 0084: a[5, 24] | a[5, 25] | a[5, 26] | a[5, 27] | a[5, 28] | a[5, 29] | a[5, 30] | a[5, 31] | a[5, 32] | a[5, 33] | a[5, 34] | a[5, 35] |

| Iteration (9). Base address = 32 | | | | | | | | | | | |
|---|---|---|---|---|---|---|---|---|---|---|---|
| 0000: a[5, 36] | a[5, 37] | a[5, 38] | a[5, 39] | a[6, 28] | a[6, 29] | a[6, 30] | a[6, 31] | a[6, 32] | a[6, 33] | a[6, 34] | a[6, 35] |
| 0012: a[6, 36] | a[6, 37] | a[6, 38] | a[6, 39] | a[7, 28] | a[7, 29] | a[7, 30] | a[7, 31] | a[7, 32] | a[7, 33] | a[7, 34] | a[7, 35] |
| 0024: a[7, 36] | a[7, 37] | a[7, 38] | a[7, 39] | a[0, 28] | a[0, 29] | a[0, 30] | a[0, 31] | A[0,32] | a[0, 33] | a[0, 34] | a[0, 35] |
| 0036: a[0, 36] | a[0, 37] | a[0, 38] | a[0, 39] | a[1, 28] | a[1, 29] | a[1, 30] | a[1, 31] | a[1, 32] | a[1, 33] | a[1, 34] | a[1, 35] |
| 0048: a[1, 36] | a[1, 37] | a[1, 38] | a[1, 39] | a[2, 28] | a[2, 29] | a[2, 30] | a[2, 31] | a[2, 32] | a[2, 33] | a[2, 34] | a[2, 35] |
| 0060: a[2, 36] | a[2, 37] | a[2, 38] | a[2, 39] | a[3, 28] | a[3, 29] | a[3, 30] | a[3, 31] | a[3, 32] | a[3, 33] | a[3, 34] | a[3, 35] |
| 0072: a[3, 36] | a[3, 37] | a[3, 38] | a[3, 39] | a[4, 28] | a[4, 29] | a[4, 30] | a[4, 31] | a[4, 32] | a[4, 33] | a[4, 34] | a[4, 35] |
| 0084: a[4, 36] | a[4, 37] | a[4, 38] | a[4, 39] | a[5, 28] | a[5, 29] | a[5, 30] | a[5, 31] | a[5, 32] | a[5, 33] | a[5, 34] | a[5, 35] |

As demonstrated above, this and related processes have the effect of logically shifting rows within the strips at preselected times. Specifically, this shifting is performed based upon the number of blocks in the working memory 166. In the example above, after the first set of three strips is stored, the second set of strips is shifted downward by one row when stored in the working memory. When the next three succeeding set of strips is to be stored in the working memory 166, then they are shifted down by two rows. This process iterates, by one row per set of three (in the example discussed) until all cells have been processed in a row of the image.

Those skilled in the art should understand that illustrative embodiments have been discussed in terms of rows of cells by example only. Other configurations of cells may be used. For example, similar principles can be applied to columns of cells. Accordingly, various embodiments are not intended to be limited to rows of cells.

In addition to the benefits described above, illustrative embodiments do not require the CPU 105 to keep track of the pointers. Instead, a simple modulo command and counter may be used to increment pointers until certain conditions are met (e.g., the reading pointer pointing to the same address location as that pointed to by the base pointer). Accordingly, CPU usage is optimized. In addition, processing one cell of image data while another strip is being loaded (i.e., pipelining) also improves system performance.

Various embodiments of the invention may be implemented at least in part in any conventional computer programming language. For example, some embodiments may be implemented in a procedural programming language (e.g., "C") or an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques).

The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A method of processing image data stored in an initial memory, the method comprising:

logically dividing the image into a plurality of contiguous strips;

storing a first plurality of the strips in a working memory having a circular addressing arrangement, the working memory being faster than the initial memory and having a plurality of sequential address locations, the first plurality of strips being contiguous and having a start address, the first plurality of strips being stored in the working memory in a contiguous manner; and processing the first plurality of strips through the working memory relative to the start address.

2. The method as defined by claim 1 wherein storing the first plurality of strips in a contiguous manner comprises storing contiguous portions of different strips in the plurality of strips in contiguous address locations of the working memory.

3. The method as defined by claim 1 wherein the working memory has a first memory location and a last memory location, the first memory location being logically contiguous with the last memory location.

4. The method as defined by claim 1 wherein processing calculates an offset from the start address.

5. The method as defined by claim 1 further comprising storing a new strip in the working memory as the first plurality of strips are being processed, the new strip being contiguous with the first plurality of strips.

6. The method as defined by claim 5 further comprising processing at least one strip from the first plurality of strips together with the new strip.

7. The method as defined by claim 1 wherein the working memory is divided into a given number of strip areas, the image data in each strip comprising a plurality of rows of image data, storing further comprising shifting the plurality of rows for storage in the working memory based upon the given number of strip areas.

8. A computer program product for use on a computer system for processing image data stored in an initial memory, the computer program product comprising a computer usable medium having computer readable program code thereon, the computer readable program code comprising:

program code for logically dividing the image into a plurality of contiguous strips;

program code for storing a first plurality of the strips in a working memory having a circular addressing arrangement, the working memory being faster than the initial memory and having a plurality of sequential address locations, the first plurality of strips being contiguous and having a start address, the first plurality of strips being stored in the working memory in a contiguous manner; and program code for processing the first plurality of strips through the working memory relative to the start address.

9. The computer program product as defined by claim 8 wherein the program code for storing the first plurality of strips in a contiguous manner comprises program code for storing contiguous portions of different strips in the plurality of strips in contiguous address locations of the working memory.

10. The computer program product as defined by claim 8 wherein the working memory has a first memory location and a last memory location, the first memory location being logically contiguous with the last memory location.

11. The computer program product as defined by claim 8 wherein the program code for processing includes program code for calculating an offset from the start address.

12. The computer program product as defined by claim 8 further comprising program code for storing a new strip in the working memory as the first plurality of strips are being processed, the new strip being contiguous with the first plurality of strips.

13. The computer program product as defined by claim 12 further comprising processing at least one strip from the first plurality of strips together with the new strip.

14. The computer program product as defined by claim 8 where in the working memory is divided into a given number of strip areas, the image data in each strip comprising a plurality of rows of image data, the program code for storing further comprising program code for shifting the plurality of rows for storage in the working memory based upon the given number of strip areas.

15. An apparatus for processing image data stored in an initial memory, the image data being logically divided into a plurality of contiguous strips, the apparatus comprising:

an address manager for accessing a working memory in a circular manner, the working memory being faster than the initial memory and having a plurality of sequential address locations;

a data transfer device for storing a first plurality of the strips in the working memory, the first plurality of strips being contiguous and having a start address, the first plurality of strips being stored in the working memory in a contiguous manner; and a processor for processing the first plurality of strips through the working memory relative to the start address.

16. The apparatus as defined by claim 15 wherein the data transfer device stores contiguous portions of different strips in the plurality of strips in contiguous address locations of the working memory.

17. The apparatus as defined by claim 15 wherein the working memory has a first memory location and a last memory location, the first memory location being logically contiguous with the last memory location.

18. The apparatus as defined by claim 15 wherein the processor calculates an offset from the start address.

19. The apparatus as defined by claim 15 further wherein the data transfer device stores a new strip in the working memory as the first plurality of strips are being processed, the new strip being contiguous with the first plurality of strips.

20. The apparatus as defined by claim 19 further wherein the processor processes at least one strip from the first plurality of strips together with the new strip.

21. The apparatus as defined by claim 15 wherein the working memory is divided into a given number of strip areas, the image data in each strip comprising a plurality of rows of image data, the data transfer device shifting the plurality of rows for storage in the working memory based upon the given number of strip areas.

* * * * *